April 7, 1942.
A. M. PISHVANOV
2,278,482
AIRCRAFT ARMAMENT
Filed May 28, 1938
2 Sheets-Sheet 1
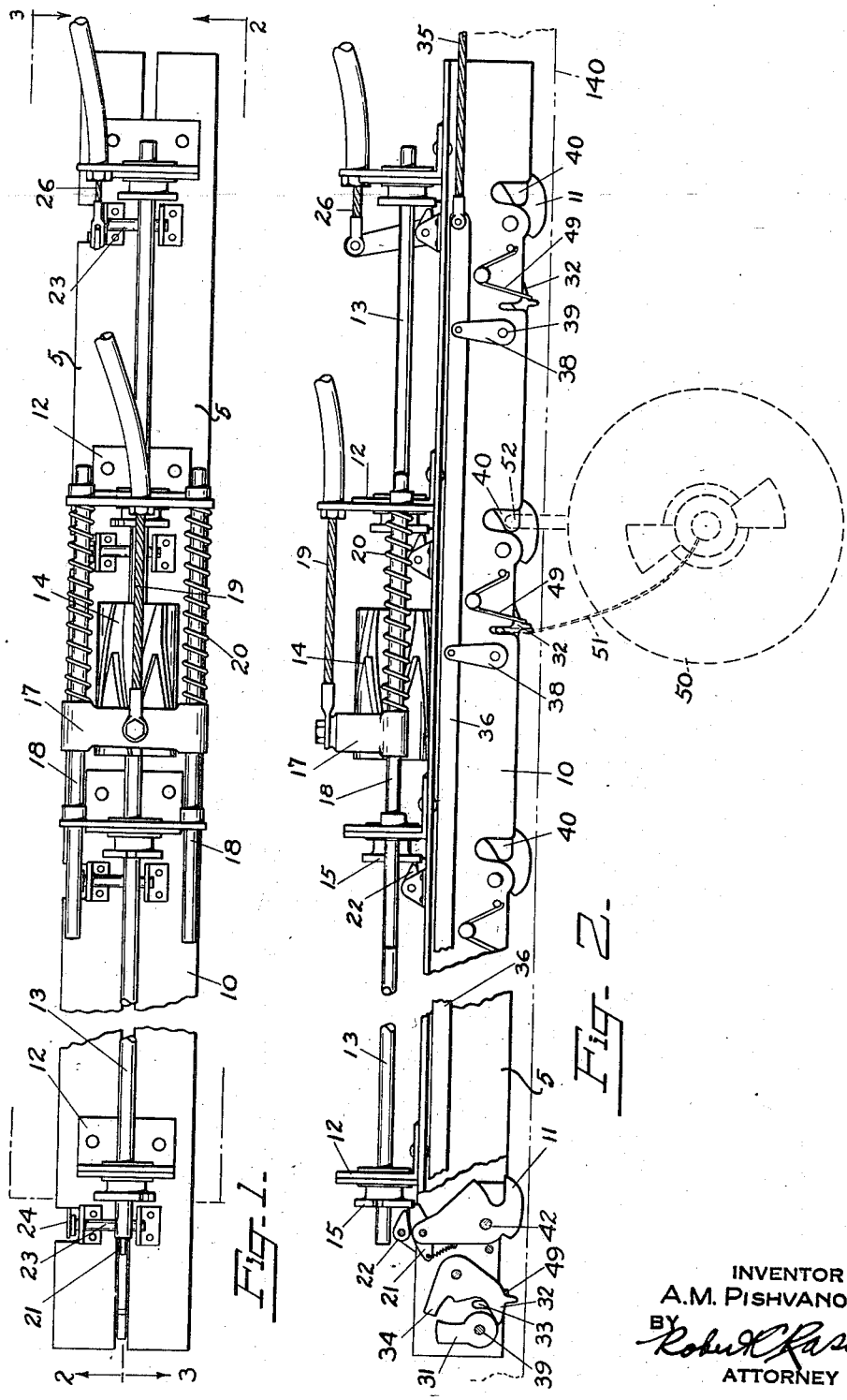
INVENTOR
A.M. PISHVANOV
BY
ATTORNEY

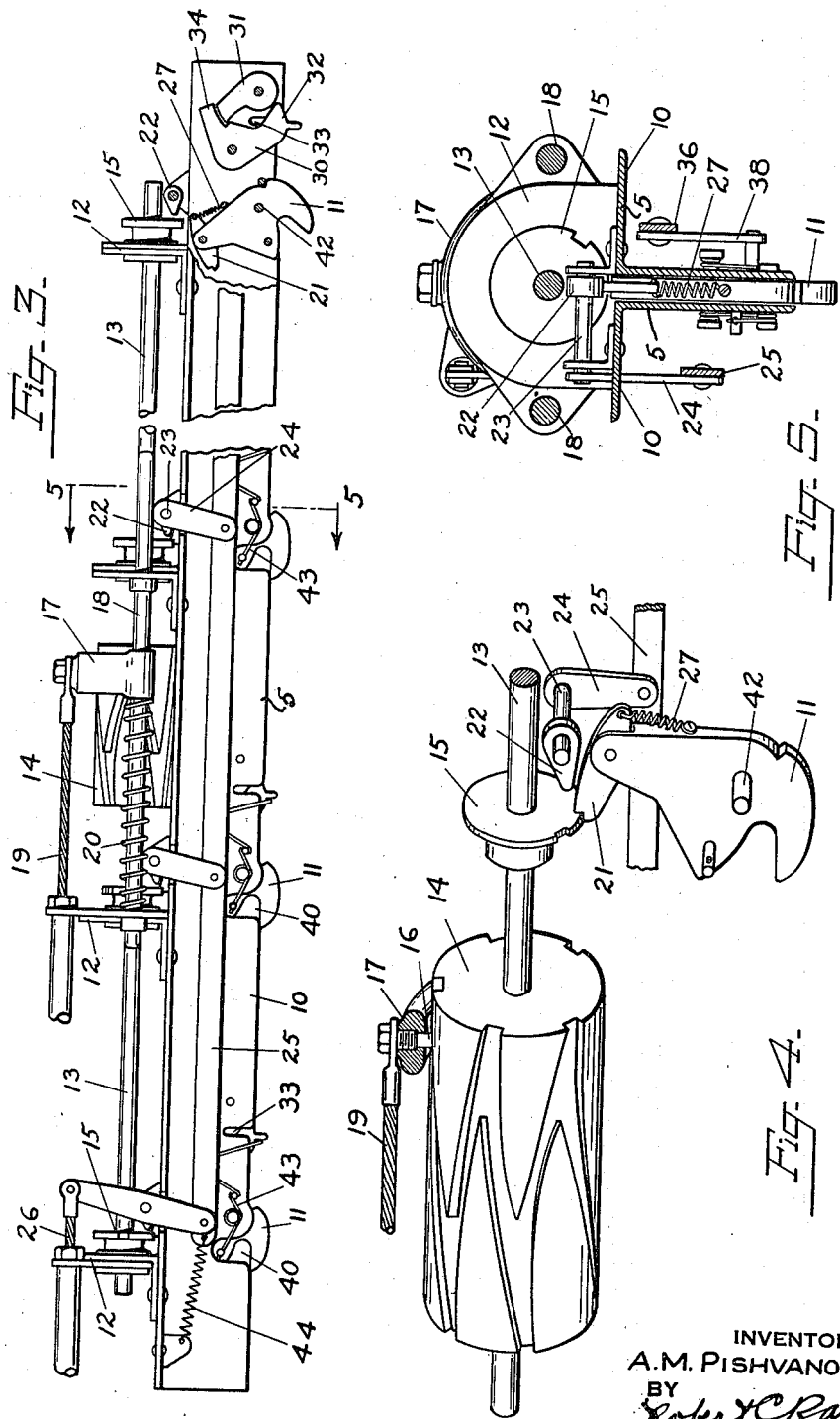

Patented Apr. 7, 1942

2,278,482

UNITED STATES PATENT OFFICE 2,278,482

AIRCRAFT ARMAMENT

Alexander M. Pishvanov, Hempstead, N. Y., assignor to Republic Aviation Corporation, a corporation of Delaware Application May 28, 1938, Serial No. 210,628

4 Claims. (Cl. 89—1.5)

This invention relates to aircraft armament and more especially to the bombing armament of military airplanes. It is particularly concerned with apparatus for carrying and discharging bombs, in relatively small, high-speed pursuit and attack airplanes. In such types of airplanes, aerodynamic and drag considerations are very important, space is at a premium, and weight limitations are quite stringent.

It is an object of the invention to provide a bomb-rack which, due to improvements in construction and organization, will be eminently adapted for mounting inside a wing or fuselage with all its parts inside the outermost surface, of a component thereof, such as a wing or a fuselage, and having no part protruding outside thereof into the airflow, whereby to obviate the drag usually incident to the use of bomb-racks which drag is quite appreciable in subsistent bomb-racks mounted on high-speed airplanes.

Another object of the invention is to provide a bomb-rack which, though capable of use to discharge bombs either in salvo or successively, will be smaller, lighter and more simple and compact than subsistent types and easier to install and to service, thus rendering it quite desirable for small military airplanes.

Yet another object of the invention is to provide a bomb-rack of this improved nature which, withal, will be simple, inexpensive and uncomplex, and thus be quite well adapted for quantity production, yet rugged, durable and reliable in service, nonetheless.

The other objects, advantages and results of the invention will be made manifest as this disclosure progresses.

One embodiment of the inventive concepts is illustrated, by way of example only, in the accompanying drawings, but it is to be understood that the invention is limited in its embodiments only by the scope of the sub-joined claims.

In these drawings,

Figure 1 is a top-plan of the bomb-rack;

Figure 2 is a fragmentary side elevation taken spanwise of a wing along line 2—2 of Figure 1, and showing a bomb in place and extending chordwise of the wing;

Figure 3 is a similar view along line 3—3 of Figure 1;

Figure 4 is a fragmentary perspective detail of a portion of the device constituting the release mechanism, and Figure 5 is an enlarged section on line 5—5 of Figure 3, sighting in the direction of the arrows.

The structure shown in the drawings includes a frame or body 10, composed of two angle-bars 5, positioned with two legs parallel and with a space between the legs to allow a series of hooks or series of catches 11, of the releasing mechanism, and the safety catches 30, to be located in series along the rack.

On top of the frame 10 are located bearing supports 12, which are riveted to the top angle legs of the frame and serve to support a shaft 13. Shaft 13 carries a cam 14 and also circular, notched, locking members 15, equidistantly distributed therealong. Engaging the slots in cam 14 is a cam follower 16 which is carried by a yoke 17, which in turn is carried by, and can reciprocate on, guide rods 18 fixedly mounted in spaced relationship on top of the base. The yoke is made to reciprocate in one direction by operating cable 19 attached to the top of the yoke. Springs 20 cause the yoke to return to its original position when the pull on the operating cable is released. The bomb-carrying hooks 11 carry sears 21 which, urged by spring 27, in cocked position, engage the lips of the locking members 15.

Cams 22, severally, are placed so as to lie above the sears when in cocked position. Cams 22 are carried by the shaft 23. To the other end of the shafts are fastened arms 24. The several arms 24 are fastened to a bar 25, thus the cams 22 may be actuated simultaneously by a pull on a cable 26. Adjacent to each hook 11 safety catches 30, for engaging the safe-releasing lanyard 51 of the bomb and locking detents 31, are mounted in the space formed by the frame, so as to allow the ear 32 of the catch 30 to bridge the opening of the slot 33. The locking detent 31 may be rotated so as to engage the projection 34 of the catch. Detents 31 are rotated by a pull on the cable 35 attached to arming bar 36. To the arming bar are pivotally attached arms 38 mounted on pivot pin 39 of the locking detent 31. Bombs 50 are loaded on the rack by placing the bomb support ring 52 in slot 40 and pressing the hook upward until sear 21 engages the lip of the member 15, whereupon the hook will support the bomb. The bomb-safety lanyard ring is then engaged in the safety-catch 32—33.

It is intended that this rack be mounted in the wing or fuselage of an airplane, with its exterior surface flush with the surface it is mounted on. In Figure 2 of the drawings, the dotted line 140 represents the outer skin of the airplane wing or fuselage.

Control cables 19, 26 and 35 are led to the cockpit or bombing station of the airplane, or may be attached to and operated by electric solenoids linkage or hydraulic means in the well-known manner.

In service, bombs 50 may be dropped successively or in salvo and either in the safe or armed condition. When it is desired to drop bombs individually, cable 19 is operated by the pilot, causing the yoke 17 to reciprocate. Cam follower 16 carried by the yoke then causes the cam 14 and the shaft 13 to turn a definite portion of arc so as to bring the notch on one of the members 15 in line with the sear 21 of one of the catches 11. Thereupon the sear that is in alignment with the notch will be able to pass through the member 15. The sear, being clear, will allow the catch 11 to pivot on pin 42, and due to the action of the spring 43 as well as the weight of the bomb, the catch will open to release the bomb. The notches in the members 15 are spaced so that only one notch can be in engagement at any given time.

To release the bombs in salvo, cable 26 is pulled causing the bar 25 to operate all the cams 22 thru the arm 24 and shaft 23. The cams 22 act to depress the sears 21 simultaneously, below the lip of the members 15, thereby allowing hooks 11 to rotate on pins 42 so as to release all the bombs in salvo. Spring 44 returns bar 25 to its original position when the pull on cable 26 is released.

To drop the bombs in the "armed" condition, the arming cable 35 must be pulled so as to actuate the locking detent 31 into engagement with the safety catch 30. Then, with the safety catch locked, upon releasing a bomb, the safety ring and wire are retained and the bomb falls away "armed," and when the safety catch is on "safe" the bomb when released pulls the safety wire 51 and ring out of engagement with the safety catch, the ring and wire being held only by the small resistance of the spring 49.

The foregoing description is to be taken as general and in no way to preclude rearrangement of parts or to prevent use of a ratchet and pawl in place of cam 14.

It is manifest from the foregoing that the racks are interchangeable; that is, the rack on the right half-wing can be changed over, without alteration of either it or its mount, to the place on the left half-wing, previously occupied by a left-wing rack.

It is also manifest that any one empty station of the rack can be loaded without, contrary to the present practice, necessitating first unloading the entire rack. As previously intimated, the rack may be operated from a remote bombing station by the cable-lanyards shown by suitable hand-operated linkages including push-pull rods, by suitable pneumatic or hydraulic means, and by electrically operated solenoids.

Various other refinements and ramifications of the particular embodiment shown are contemplated as within the scope of the sub-joined claims.

I claim:

1. In a bomb-rack of the type comprising a frame and a plurality of hooks pivotally mounted upon the frame, each adapted to suspend a bomb and adapted to be swung by the weight of the bomb to release said bomb therefrom, release-control means comprising a rotatably supported shaft, abutments fixed upon the shaft arranged in angularly-offset relation, pivoted fingers mounted upon the hooks and adapted to normally engage said abutments and restrain swinging movement of the hooks, means for rotating the shaft to successively move the abutments out of restraining position with respect to said fingers, and means operable independently of the shaft-rotating means for simultaneously moving the fingers out of engagement with said abutments to allow the hooks to swing to bomb-release position.

2. In a bomb-rack of the type comprising a frame and a plurality of hooks pivotally mounted upon the frame, each adapted to suspend a bomb and adapted to be swung by the weight of the bomb to release said bomb therefrom, release control means comprising a rotatably supported shaft, a plurality of notched cam disks fixed upon the shaft in spaced relation, the notches of said disks being arranged in angularly-offset relation with respect to each other, spring-like fingers pivoted upon the upper ends of said hooks and normally engaging the disks to restrain swinging movement of said hooks, means for intermittently rotating the shaft to successively move said notches into registry with the fingers and allow the hooks to swing to bomb-release position, and means operable independently of the shaft-rotating means for simultaneously moving said fingers clear of the disks to allow said hooks to swing to bomb-release position.

3. In a bomb-rack of the type comprising a frame and a plurality of hooks pivotally mounted upon the frame, each adapted to suspend a bomb and adapted to be swung by the weight of the bomb to release said bomb therefrom, release control means comprising a rotatably supported shaft, a plurality of notched cam disks fixed upon the shaft in spaced relation, the notches of said disks being arranged in angularly-offset relation with respect to each other, spring-held fingers pivoted upon the upper ends of said hooks and normally engaging the disks to restrain swinging movement of said hooks, means for intermittently rotating the shaft to successively move said notches into registry with the fingers and allow the hooks to swing to bomb-release position, trip members pivotally mounted upon the frame, a longitudinally-movable rod operatively connected to said trip members for rocking said trip members into and out of engagement with said fingers, and means independent of the shaft-rotating means for actuating said rod to simultaneously move the fingers free of the disks and allow the hooks to swing to bomb-release position.

4. In a bomb-rack of the type comprising a frame and a plurality of hooks pivotally mounted upon the frame, each adapted to suspend a bomb and adapted to be swung by the weight of the bomb to release said bomb therefrom, release-control means comprising a rotatably supported shaft, abutments fixed upon the shaft arranged in angularly-offset relation and adapted to normally restrain swinging movement of the hooks, a cylindrical cam secured upon the shaft provided with a longitudinally inclined cam track, a finger adapted to engage the cam track, normally-operated means for moving the finger in one direction and yielding means for moving said finger in the reverse direction for imparting intermittent rotation to the shaft to successively move the abutments out of restraining position with respect to the hooks, and means operable independently of the shaft-rotating means for simultaneously clearing the hooks of said abutments.

ALEXANDER M. PISHVANOV.